I. M. WEST.
Churn.
No. 57,606.            Patented Aug. 28, 1866.
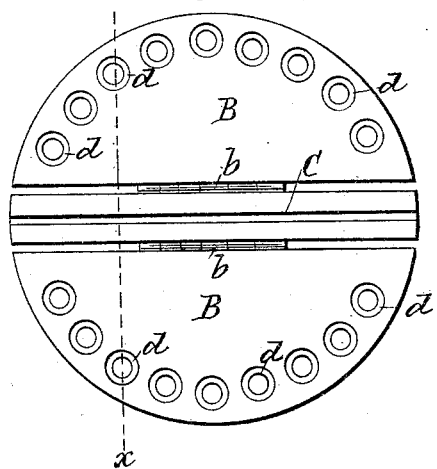
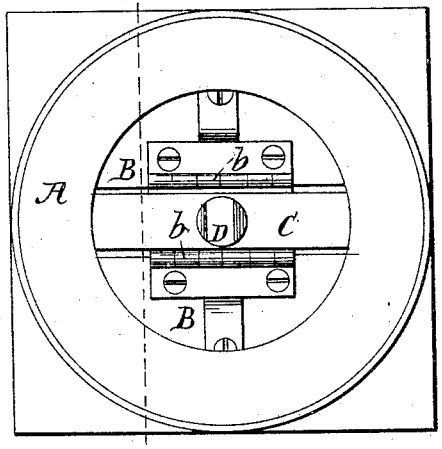
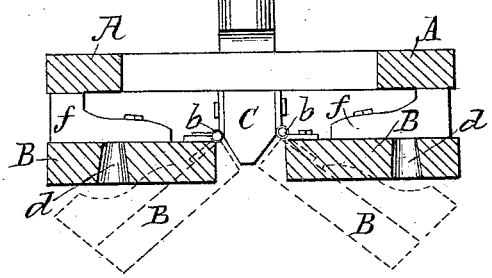
Witnesses.
Thomas T. Parker
Wm. F. Brown
Inventor
Isaiah M. West
By his attys
J. S. Brown

UNITED STATES PATENT OFFICE.

ISAIAH M. WEST, OF WILMINGTON, OHIO.

IMPROVEMENT IN CHURNS.

Specification forming part of Letters Patent No. 57,606, dated August 28, 1866.

*To all whom it may concern:*

Be it known that I, ISAIAH M. WEST, of Wilmington, in the county of Clinton and State of Ohio, have invented an Improved Churn-Dasher; and I do hereby declare that the following is a full and exact description thereof, reference being had to the accompanying drawings, making part of this specification.

Figure 1 is a top view of the dasher; Fig. 2, a bottom view thereof; Fig. 3, a vertical section thereof in a plane indicated by the line $x\ x$, Figs. 1 and 2.

Like letters designate corresponding parts in all of the figures.

My improved dasher is composed of a ring, A, or disk, open in the middle, and two hinged dasher-boards or wings, B B, which automatically turn downward into an oblique position, and allow a comparatively free passage of the cream around them while the dasher is ascending, but close upward into a horizontal position, thus nearly or quite closing the interior of the churn-body while the dasher is descending.

The dasher-boards are hinged at $b\ b$ to a central cross-head, C, to which the dasher handle or shaft D is secured. The dasher-ring A is also secured to the cross-head.

Directly beneath the dasher-ring A a set of holes, $d\ d$, is made in the dasher-boards B B, and these holes are properly made conical or tapering from bottom to top, as shown. The action of these holes is to direct the cream in numerous small streams upward against the dasher-ring A as the dasher descends, and as the dasher-boards in the descent cover or nearly cover the space in the churn-body, the cream is forced with violence through these apertures upward against the dasher-ring, which is situated but an inch or two above the dasher-boards. The conical form of the apertures compresses the cream, and makes the pressure and force of the streams still greater, and thus the globules are more surely and quickly broken. The arrangement of the holes need not be circular, nor need the dasher-ring be of simple annular form; but it may vary considerably without changing its action. All that is essential is that the streams of cream, as they are forced up through the apertures, should strike directly against the bottom of the ring.

The dasher-boards strike against the stops $f\ f$, and prevent their rising above a horizontal position.

The dasher is represented as being circular, to fit a circular churn-body; but it may be square, as indicated by red lines in Fig. 1, to fit a square churn-body. The arrangement of the apertures $d\ d$ and the ring A, even in that case, may be circular or not.

What I claim as my invention, and desire to secure by Letters Patent, is—

The combination of the dasher-ring A and apertures $d\ d$, whether conical or not, in the dasher-boards B B, substantially as and for the purpose herein specified.

The above specification of my improved churn-dasher signed by me this 7th day of June, 1866.

ISAIAH M. WEST.

Witnesses:
 J. S. BROWN,
 WM. F. BROWNE.